March 27, 1945. E. E. HEWITT 2,372,326
FLUID DRIVE FOR COMPRESSORS
Filed June 30, 1943
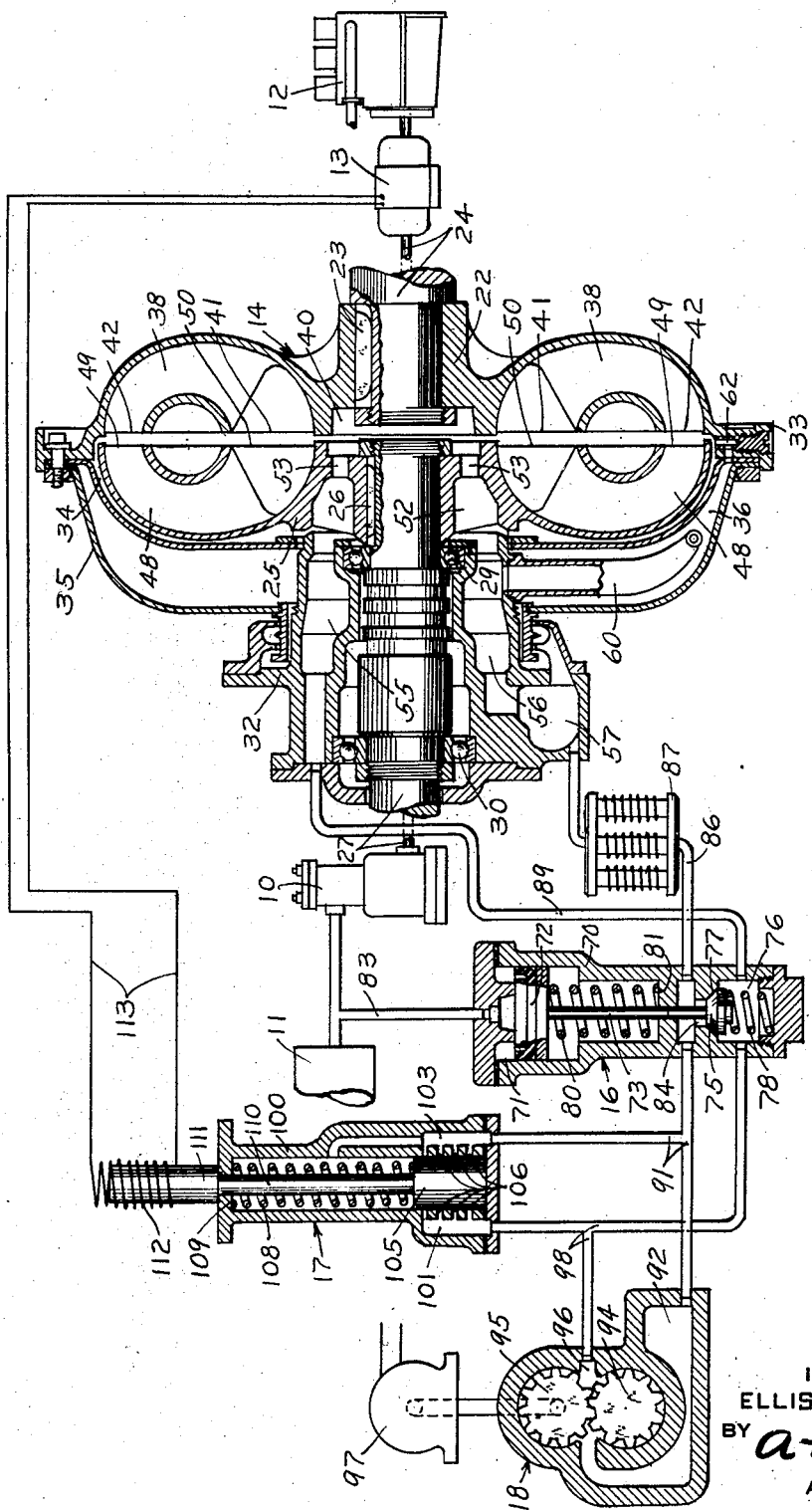
INVENTOR
ELLIS E. HEWITT
BY
ATTORNEY

UNITED STATES PATENT OFFICE 2,372,326

FLUID DRIVE FOR COMPRESSORS

Ellis E. Hewitt, Edgewood, Pa., assignor to The Westinghouse Air Brake Company, Wilmerding, Pa., a corporation of Pennsylvania Application June 30, 1943, Serial No. 492,793

3 Claims. (Cl. 230—15)

This invention relates to fluid power transmission equipment, and particularly to a fluid drive apparatus operable by a variable speed engine to drive and control operation of a compressor or other device.

In a transportation service in which a Diesel-electric power equipment is employed, it has been proposed to utilize a portion of the mechanical energy developed by the engine to effect direct operation of an associated compressor, thereby saving the expense and waste of a separate driving motor. Because of the varying speed at which the Diesel engine is generally operated, however, it is desirable to provide for transmission of power therefrom to the compressor through the medium of a driving apparatus automatically controlled to effect substantially constant speed operation of the compressor regardless of the speed of the engine. One object of my invention is to provide an improved hydraulic drive apparatus constructed and arranged to effect operation of a driven member at a constant speed by a driving member the speed of which may vary.

It is another object of my invention to adapt a well known type of fluid drive apparatus for directly transmitting power from a Diesel-electric assembly to a compressor of the class described, by associating therewith an automatic fluid pressure controlling system of novel construction.

Another object of the invention is to provide an improved fluid power transmission equipment including fluid pressure means responsive to operation of the engine for insuring operation of the compressor at a relatively constant speed, and governor means for also controlling the compressor in accordance with receiving reservoir pressure.

A further object of the invention is to provide an improved hydraulic drive equipment which may be constructed and arranged to couple a Diesel-electric power unit and a compressor for driving the latter at a selected normal speed during operation of the engine at a slow or idling speed, and including control means for preventing operation of the compressor at excessive speed when the engine is driven at a faster rate.

Still another object is to provide a compressor governor adapted to cooperate with a fluid drive system for starting and stopping the compressor in accordance with the pressure of fluid compressed thereby.

In the drawing, the single figure is a diagrammatic view of a compressor and fluid power transmission equipment, with certain elements thereof shown in section, it being understood that certain parts of the assembly are shown in reduced size.

Referring to the drawing, the apparatus illustrated comprises a compressor 10 operative to supply fluid under pressure to a reservoir 11, a Diesel engine 12, a generator 13 operatively connected thereto, a hydraulic torque converter or coupling device 14 for transmitting power from the engine to the compressor, a compressor governor device 16, a control valve device 17, and a motor driven pump 18.

The hydraulic power coupling device 14 comprises a rotary impeller 22, which is secured by means of a key 23 to a driving shaft 24 which, in the present embodiment of the invention, is associated with both the Diesel engine 12 and generator 13. The coupling device also comprises a runner 25, which is rotatably mounted adjacent the impeller and is secured by means of a key 26 to a driven shaft 27. The driven shaft 27 is journaled in bearing assemblies 29 and 30 suitably mounted in a casing structure 32, and constitutes an extension of the usual crank shaft of the compressor 10. The impeller 22 has a peripheral portion 33 overlapping the outer portion of the runner 25 and carrying a pair of annular skirt portions or shells 34 and 35, which are adapted to extend over the runner for containing the hydraulic fluid that is introduced between the two rotary elements, as hereinafter explained.

The impeller 42 is provided with a plurality of semi-circular cavities 38 which are arranged radially therein and open into a chamber 40 intermediate the impeller and runner by way of inlet ports 41 and outlet ports 42. It will be observed that the inlet ports 41 of the cavities 38 are disposed at a smaller radial distance from the axis of the impeller than are the outlet ports 42.

The runner 25 is adapted to be driven by hydraulic fluid thrown from the impeller and is similarly provided with semi-circular cavities 48 opening into the intermediate chamber 40 by way of outer and inner ports 49 and 50, which are arranged in concentric alignment with the ports 42 and 41, respectively. The hub of the runner 25 has formed therein an annular cavity 52 communicating by way of supply ports 53 with the chamber 40. Also communicating with the annular cavity 52 in the runner are an inlet passage 55 formed in the casing structure 32, and an outlet passage 56 which in turn communicates with a drain chamber 57 formed in the lower portion of the casing structure. A pick-up tube 60 is secured to the casing structure adjacent the outlet passage 56, and extends downwardly between the inner and outer shells 34 and 35. This tube is adapted to carry to the passage 56 some of the hydraulic fluid that travels at high velocity within the space 36 between the rotating shells, during operation of the device as hereinafter explained. Communication between the chamber 40 intermediate the impeller and runner and the space 36 is maintained through the medium of a plurality of leakoff nozzles 62, which are formed in the peripheral portion 33 of the impeller.

The compressor governor device 16 comprises a casing structure 70 having a bore 71 in which is slidably mounted a piston 72, which is operatively connected through the medium of a stem 73 with a valve element 75 that is disposed within a valve chamber 76. The valve element 75 is normally held in engagement with a seat 77 formed on the casing structure, under the force exerted by a coil spring 78, while the piston 72 is normally maintained in its uppermost position as shown in the drawing under the force of a coil spring 80, which is interposed between the piston and a wall 81 formed within the casing structure. The bore 71 is connected through a pipe 83 with the reservoir 11, so that the piston 72 is subject to the pressure of fluid in the reservoir in opposition to the combined forces of springs 78 and 80. The valve element 75 is adapted to control communication from the chamber 76 to a chamber 84, which is formed in the casing structure and communicates by way of a conduit 86 and an assembly of cooling tubes 87 with the drain chamber 57 of the fluid coupler device 14. The valve chamber 76 is at all times in communication through a pipe 89 with the inlet passage 55 of the fluid coupler device.

The chamber 84 of the governor device 16 also communicates by way of a pipe 91 with the sump chamber 92 of a pump 18, which in the elementary form of the device as illustrated comprises a pumping gear element 94 and a similar gear 95 cooperative therewith for supplying hydraulic fluid from the sump to a discharge passage 96. The pumping gear 95 may be driven at a constant speed by any suitable means, such as an electric motor 97. The discharge passage 96 of the pump is connected through the medium of a pipe 98 with the valve chamber 76 of the governor device 16.

The control valve device 17 is designed for operation to control circulation of hydraulic fluid through the fluid coupling device 14 in accordance with the speed at which the generator 13 is driven by the engine 12. This device comprises a casing structure 100 having an inlet passage 101 communicating with the pipe 98, an outlet passage 103 communicating with the pipe 91, and an intervening bore containing a valve plunger 105 that is adapted to establish communication between the passages 101 and 103 through one or more ports 106 formed in the walls of the bore. A coil spring 108 is interposed between the plunger valve 105 and an upper wall 109 of the casing structure, and is normally effective to hold the plunger valve in its lowermost position, as shown in the drawing, for thereby closing all of the ports 106. The plunger valve has a stem 110 which extends upwardly through an aperture in the wall 109 and is connected to a core member 111 that is operatively associated with a magnet coil 112 suitably mounted on the casing structure. The coil 112 is arranged for energization through the medium of suitable conductors 113 leading to the generator 13. Although the details of the electrical connections need not be described in detail, it will be understood that the magnet coil 112 is constructed and arranged to be energized to a degree that is a measure of the speed at which the generator 13 is operated by the engine 12, and that the core member 111 of the control valve device 17 is thereby subjected to a variable upward pull in opposition to the force exerted by the spring 108.

When the equipment is in condition for operation, the pump 18 is adapted to be driven by motor 97 to supply hydraulic fluid from the sump 92 to the chamber 40 of the hydraulic coupling device 14 by way of pipe 98, valve chamber 76 in governor device 16, pipe 89, and inlet passage 55, while hydraulic fluid is free to flow back to the sump 92 of the pump through the outlet passage 56, drain chamber 57, cooling tube assembly 87, pipe 86, chamber 84 in the governor device, and pipe 91. Upon operation of the generator 13 by the Diesel engine 12, the shaft 24 and impeller 22 are rotated relative to the initially stationary runner 25, with the result that hydraulic fluid is drawn from the chamber through the radial cavities 38 and ejected at an accelerated velocity from the outer ports 42 of the impeller. The hydraulic fluid is thereby thrown tangentially against the vane surfaces of the runner 25 between the cavities 48 therein, and as it flows inwardly through the cavities exerts a torque against the runner 25 causing rotation thereof with the impeller 22. Circulation of the hydraulic fluid through the communications in the impeller and runner elements is in part controlled by the rate of flow through the leak-off nozzles 62 communicating with the space 36 between the shells 34 and 35, and from which fluid is drawn through the pickup tube 60 and into the outlet passage 56, as already explained.

It will be understood that the quantity of hydraulic fluid circulating through the cavities in the impeller and runner elements determines the ratio of the runner speed to the impeller speed, and consequently the relative speed at which the compressor 10 is driven by the Diesel engine 12. In other words, the speed of the compressor may be expected to approach that of the Diesel engine when the quantilty of hydraulic fluid available for circulation through the hydraulic coupling device 14 is increased, while on the other hand a withdrawal of hydraulic fluid from the hydraulic coupling device will result in reduction in the speed of the compressor relative to that of the engine.

Assuming that the illustrated equipment is carried on a railway locomotive, the hydraulic coupling device and the associated controlling apparatus are preferably constructed and arranged to effect operation of the compressor 10 at about the normal maximum speed for which it is designed, so long as the Diesel engine 12 rotates the drive shaft 24 at an idling speed. Under this operating condition, the maximum quantity of hydraulic fluid is circulated through the hydraulic coupling device 14 for causing the runner 25 to be driven by the impeller 22 with a minimum slip or speed differential, as will be apparent from the foregoing description. When the Diesel engine 12 is thus operated to drive the generator 13 at an idling speed, the output of the generator, as measured by the extent of energization of magnet coil 112 of the control valve device 17, is too low to cause operation of the valve plunger 105, so that the element is held in the normal position, as shown, under the force of the spring 108. Assuming that the pressure of fluid in the reservoir 11 remains below that required to cause operation of the governor device 16, and that the valve element 75 is likewise held in its normal seated position, the entire output of hydraulic fluid is thus delivered from the motor driven pump 18 to the hydraulic coupling device 14.

When the Diesel engine 12 is subsequently operated at a higher speed, thus increasing the output of the generator 13 as well as the rotative speed of the shaft 24 and impeller 22, the resultant increase in energization of the magnet coil 112 of the control valve device 17 causes upward movement of the core member 111, stem 110, and valve plunger 105, in opposition to the force of spring 108. In so moving, the valve plunger 105 uncovers one or more of the ports 106 and thereby establishes communication between the pipes 98 and 91, through which a portion of the hydraulic fluid discharged by pump 18 flows back to the sump 92. The quantity of hydraulic fluid which continues to flow on through the pipe 98, valve chamber 76, and pipe 89 to the hydraulic coupling device 14 is thus reduced sufficiently to cause a lag in the rotative speed of the runner 25 with respect to the speed of the impeller 22. Assuming that the various operating elements of the equipment have been properly proportioned and designed, it will be understood that although the impeller 22 of the hydraulic coupling device is now driven at a higher speed than that corresponding to the idling speed of the engine 12, the runner 25 is nevertheless operated to drive the compressor 10 at substantially the normal speed by reason of the reduction in the driving ratio, in the manner just explained.

The compressor governor device 16 is operative independently of the control valve device 17, in accordance with variations in the pressure of fluid supplied to the reservoir 11 by the compressor 10. Upon an increase in reservoir pressure to the value to which the governor device 16 is designed to respond for unloading the compressor, the piston 72 is forced downwardly against the spring 80 and acts through the medium of the stem 73 to move the valve element 75 away from seat 77. A wide open communication is thereby established through which hydraulic fluid is free to flow from the valve chamber 76 through chamber 84 and pipe 91 to the sump 92, so that substantially all of the fluid is diverted from the communication leading to the hydraulic coupling device 14. As hydraulic fluid is consequently withdrawn from the coupling device, the runner 25 and shaft 27 cease to revolve with the impeller 22, and the compressor 10 becomes inoperative.

When the pressure of fluid in the reservoir 11 falls below the pressure for which the governor device 16 is set, the spring 80 becomes effective to shift piston 72, stem 73, and valve element 75 upwardly until the valve element again closes communication between the chambers 76 and 84. Continued operation of the pump 18 is then effective to restore the circulation of hydraulic fluid through the hydraulic coupling device 14, and the compressor 10 will again be set in operation in the manner hereinbefore explained.

It will thus be seen that a fluid drive controlling apparatus embodying the features of the invention just described and arranged for coupling a Diesel electric power equipment with a compressor, will be automatically operative at all times to effect operation of the compressor at a substantially constant speed regardless of variations in the driving engine speed, and also to govern operation of the compressor in accordance with the fluid pressure in the receiving reservoir.

Having now described my invention, what I claim as new and desire to secure by Letters Patent, is:

1. In a hydraulic drive and control apparatus constructed and arranged for coupling a variable speed engine to a compressor, in combination, a hydraulic coupling device operable by said engine to drive said compressor at a rate determined by the circulation of fluid therein, a generator driven by said engine, pump means operable to deliver a constant supply of fluid, and electroresponsive valve means energized in accordance with operation of said generator for controlling the flow of fluid from said pump means to said coupling device.

2. In a hydraulic drive and control equipment constructed and arranged for coupling a variable speed engine to a compressor, in combination, a fluid torque converter operable in accordance with circulation of fluid therein to transmit torque from said engine to said compressor, a constant speed pump having a sump reservoir associated therewith, pressure communication means through which said pump is adapted to supply fluid under pressure to said torque converter, drain communication means for conducting return flow of fluid from said torque converter to said sump reservoir, and control valve means operable to establish a by-pass communication between said pressure communication means and said drain communication means.

3. In a hydraulic drive and control equipment constructed and arranged for coupling a variable speed engine to a compressor, in combination, a fluid torque converter operable in accordance with circulation of fluid therein to transmit torque from said engine to said compressor, a constant speed pump having a sump reservoir associated therewith, pressure communication means through which said pump is adapted to supply fluid under pressure to said torque converter, drain communication means for conducting return flow of fluid from said torque converter to said sump reservoir, control valve means operable to establish a variable by-pass communication between said pressure communication means and said drain communication means, and means responsive to the speed of operation of said engine for actuating said control valve means, whereby said compressor is driven at substantially constant speed regardless of variations in the speed of said engine.

ELLIS E. HEWITT.